(12) United States Patent
Graham et al.

(10) Patent No.: US 10,826,889 B2
(45) Date of Patent: Nov. 3, 2020

(54) TECHNIQUES FOR ONBOARDING DEVICES BASED ON MULTIFACTOR AUTHENTICATION

(71) Applicant: Cisco Technology, Inc., San Jose, CA (US)

(72) Inventors: Mickael James Graham, Bellevue Hill (AU); Santosh Ramrao Patil, Santa Clara, CA (US); Shyam Sundar Vaidyanathan, Milpitas, CA (US); Chiragkumar Desai, San Jose, CA (US); Swaminathan Anantha, Mountain View, CA (US)

(73) Assignee: CISCO TECHOLOGY, INC., San Jose, CA (US)

( * ) Notice: Subject to any disclaimer, the term of this patent is extended or adjusted under 35 U.S.C. 154(b) by 408 days.

(21) Appl. No.: 15/794,259

(22) Filed: Oct. 26, 2017

(65) Prior Publication Data
US 2019/0132308 A1    May 2, 2019

(51) Int. Cl.
  H04L 29/06    (2006.01)
(52) U.S. Cl.
  CPC ...... *H04L 63/0823* (2013.01); *H04L 63/0876* (2013.01); *H04L 63/107* (2013.01); *H04L 2463/082* (2013.01)
(58) Field of Classification Search
  CPC ............. H04L 63/0823; H04L 63/0876; H04L 63/107; H04L 2463/082
  See application file for complete search history.

(56) References Cited

U.S. PATENT DOCUMENTS

| 2005/0144437 A1* | 6/2005 | Ransom | G06F 21/606 713/151 |
| 2009/0031410 A1* | 1/2009 | Schneider | H04L 63/0823 726/10 |
| 2009/0138946 A1* | 5/2009 | Schneider | G06F 21/33 726/5 |

(Continued)

OTHER PUBLICATIONS

Rohitash Kumar Banyal, "Multi-factor Authentication Framework for Cloud Computing," IEEE Computer Society, 2013, pp. 105-110. (Year: 2013).*

(Continued)

*Primary Examiner* — Luu T Pham
*Assistant Examiner* — Canh Le
(74) *Attorney, Agent, or Firm* — Polsinelli PC

(57) ABSTRACT

A server receives a certificate signing request and onboarding information for an applicant device, and identifies a customer associated with the applicant device based on an applicant device identifier and a database identifiers associated with customers. The device determines a registered device associated with the customer is a trusted device, a location trust value for the applicant device based on a geolocation proximity between the applicant device and the trusted device, and an environment trust value for the applicant device based on a proximity in a network topology between the applicant device and the trusted device. The device further determines a trust score for the applicant device based on the location trust value and the environment trust value, and sends a signed certificate to the applicant device over the network when the trust score for the applicant device exceeds a threshold.

20 Claims, 13 Drawing Sheets

(56) References Cited

U.S. PATENT DOCUMENTS

| | | | | |
|---|---|---|---|---|
| 2011/0078775 | A1* | 3/2011 | Yan | H04L 63/1433 |
| | | | | 726/6 |
| 2013/0067110 | A1* | 3/2013 | Sarawat | H04L 61/2517 |
| | | | | 709/238 |
| 2013/0297242 | A1* | 11/2013 | Bartmess | G06Q 50/06 |
| | | | | 702/61 |
| 2013/0318343 | A1* | 11/2013 | Bjarnason | H04L 63/08 |
| | | | | 713/157 |
| 2014/0215580 | A1* | 7/2014 | Behringer | H04L 63/105 |
| | | | | 726/5 |
| 2014/0250496 | A1* | 9/2014 | Amidon | G06F 7/02 |
| | | | | 726/3 |
| 2016/0285858 | A1* | 9/2016 | Li | G06F 21/41 |
| 2017/0026859 | A1* | 1/2017 | Ahmadzadeh | H04W 24/08 |
| 2017/0150308 | A1* | 5/2017 | Jones | H04W 4/021 |
| 2018/0077169 | A1* | 3/2018 | Stelfox | G06F 21/44 |

OTHER PUBLICATIONS

Yogendra Shah et al. "Multi-factor Authentication as a Service," IEEE Computer Society, 2015, pp. 144-150. (Year: 2015).*

* cited by examiner

| SR. NO. | DEVICE ID | STATUS | ACTION | TRUST SCORE |
|---|---|---|---|---|
| 1 | FN2341TQA | UNCLAIMED UNTRUSTED | APPROVE CSR ▽ | 60 — DEVICE INFO / ACTIVATION TIME / LOCATION. REGISTERED LOCATION: SAN JOSE, CA; PROBABLE SITE LOCATION: SAN JOSE, CA; ACTIVATION TIME: WITHIN THRESHOLD; DEVICE SIDE INFO: N/A |
| 2 | FN3441XRA | UNCLAIMED UNTRUSTED | DENY CSR ▽ | 34 — DEVICE INFO / ACTIVATION TIME / LOCATION. REGISTERED LOCATION: SAN JOSE, CA; PROBABLE SITE LOCATION: SAN DIEGO, CA; ACTIVATION TIME: WITHIN THRESHOLD; DEVICE SIDE INFO: N/A |
| 3 | FN2313MCA | CLAIMED TRUSTED | APPROVED ▽ | 85 — DEVICE INFO / ACTIVATION TIME / LOCATION. REGISTERED LOCATION: SAN JOSE, CA; PROBABLE SITE LOCATION: SAN JOSE, CA; ACTIVATION TIME: WITHIN THRESHOLD; DEVICE SIDE INFO: CONFIRMED |

TECHNIQUES FOR ONBOARDING DEVICES BASED ON MULTIFACTOR AUTHENTICATION

TECHNICAL FIELD

This disclosure relates generally to communications systems, more particularly, to multifactor authentication for securing communication channels.

BACKGROUND

Authentication remains a persistent technical problem in our modern information age, driven, in part, by an ever-increasing reliance on network accessible hardware, cloud-based services, as well as a proliferation of untrusted applications and untrusted networks. Generally, authentication is part of an overall security process to determine trustworthiness of an applicant device (or application, service, user, etc.) prior to establishing a secure communication channel. Typically, authentication techniques are described in terms of the number of factors used to identify/verify the applicant device. For example, a typical username/password process includes a two-factor authentication in that a user provides two pieces of information for authentication. Moreover, authentication processes that involve more factors are often more secure (e.g., multifactor authentication processes), however, employing additional factors often involves additional complexity, cost, and time.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which:

FIG. 9 illustrates a schematic diagram of an example onboard dashboard display, showing applicant devices and associated trust scores.

DESCRIPTION OF EXAMPLE EMBODIMENTS

Overview

Figure 1:
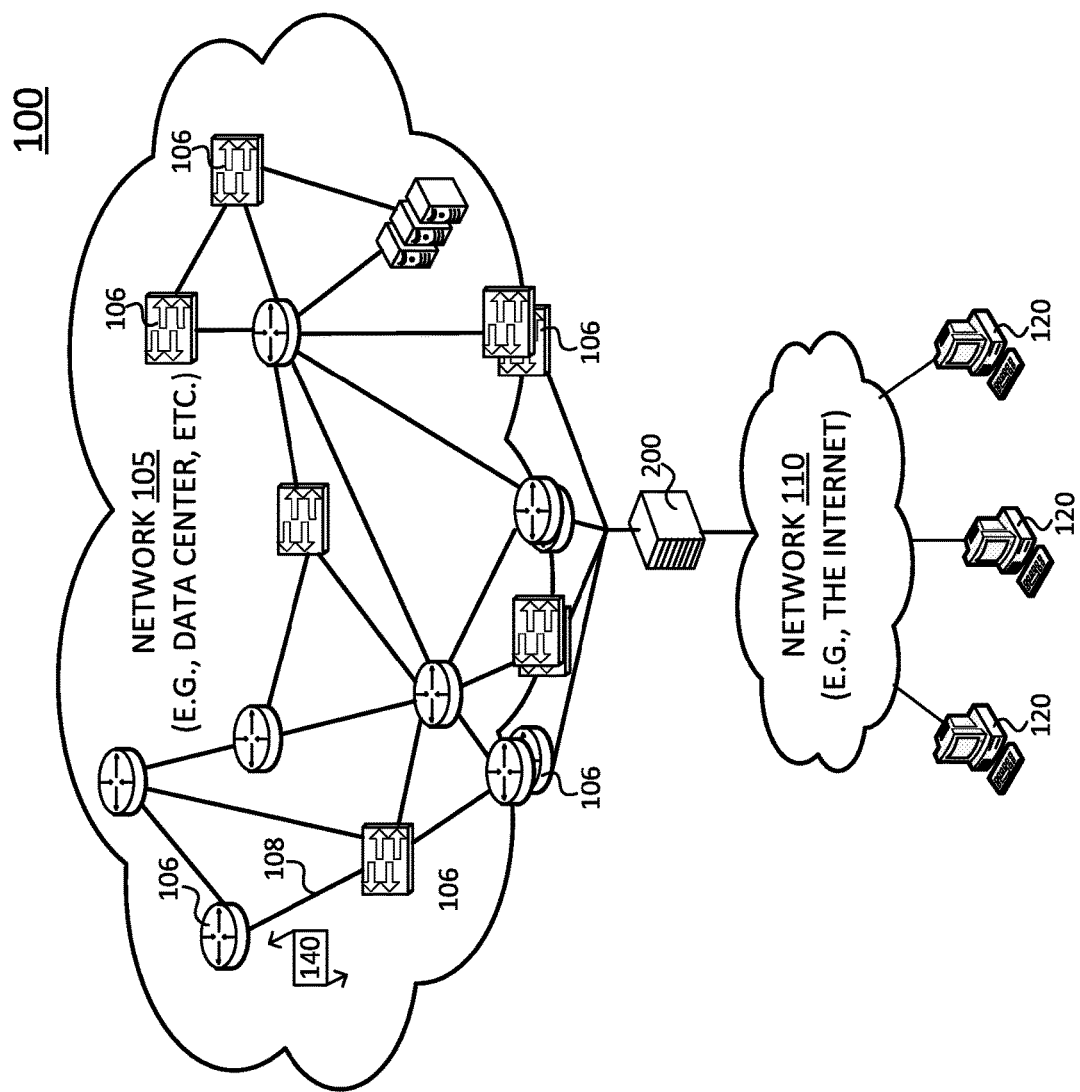
FIG. 1 illustrates an example communication environment.

According to one or more embodiments of the disclosure, an onboarding server performs a multifactor trust/authentication process to onboard an applicant device—e.g., to secure a communication channel between the applicant device and one or more other network devices (e.g., cloud based resources, etc.). For example, in one embodiment, the server receives a certificate signing request (CSR) and onboarding information for an applicant device, where the onboarding information includes at least an applicant device identifier and an applicant Internet Protocol (IP) address. The server also identifies a customer associated with the applicant device based on the applicant device identifier and a database of device identifiers (e.g., a lookup database) for registered devices associated with one or more customers. The server further determines at least one of the registered devices is associated with the customer is a trusted device, and determines a location trust value, an environment trust value, and a trust score based on the location trust value/environment trust value. For example, the server determines the location trust value based on a geolocation proximity between the applicant IP address and a trusted IP address for the trusted device, and determines the environment trust value based on a proximity in a network topology between the applicant device and the trusted device. The server sends a signed certificate, corresponding to the CSR, to the applicant device when the trust score for the applicant device exceeds a threshold.

Description

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

As noted above, modern businesses increasingly rely on network accessible hardware and software. In this context, network based computing or "cloud" computing generally refers to a collection of computing resources, such as hardware, software, applications, services, etc., allocated to and accessible by customers over one or more communication networks (e.g., the Internet). Operatively, customer devices communicate within and across networks to register, lease, coordinate, or otherwise secure network based computing resources based on customer needs.

A communication network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect these nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, etc.

FIG. 1 illustrates an example communication network environment 100 illustratively comprising a network 105, such as an enterprise network or data center network, as well as a network 110, such as a public network like the Internet. It is appreciated that various other types of networks and/or sub-divisions within these networks are often present; however, communication network environment 100 is illustrated and described herein for purposes of discussion and simplicity.

As shown, network 105 include nodes/devices 106 (e.g., routers, switches, servers, and the like) interconnected by communication links 108. Communication links 108 may be wired links or shared media (e.g., wireless links, etc.) where certain devices may be in communication with other nodes/devices based on, for example, distance, signal strength, network/node topology, current operational status, location, etc. Data packets 140 (e.g., traffic and/or messages) may be exchanged among the nodes/devices 106 in communication network environment 100 using predefined network communication protocols such as certain known wired protocols (e.g., Interior Gateway Protocol (IGP), Exterior Border Gateway Protocol (E-BGP), TCP/IP, etc.), wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other. Those skilled in the art will also understand that any number of computing resources, devices, links, etc. may be used in network 105, and that the view shown herein is for simplicity.

Notably, certain nodes/devices 106 in network 105 include "edge" devices interconnected with an onboarding server 200. Onboarding server 200 operatively facilitates communications between one or more client devices 120 in network 110 and network resources (e.g., devices 106) in network 105, as discussed in greater detail below.

Figure 2:
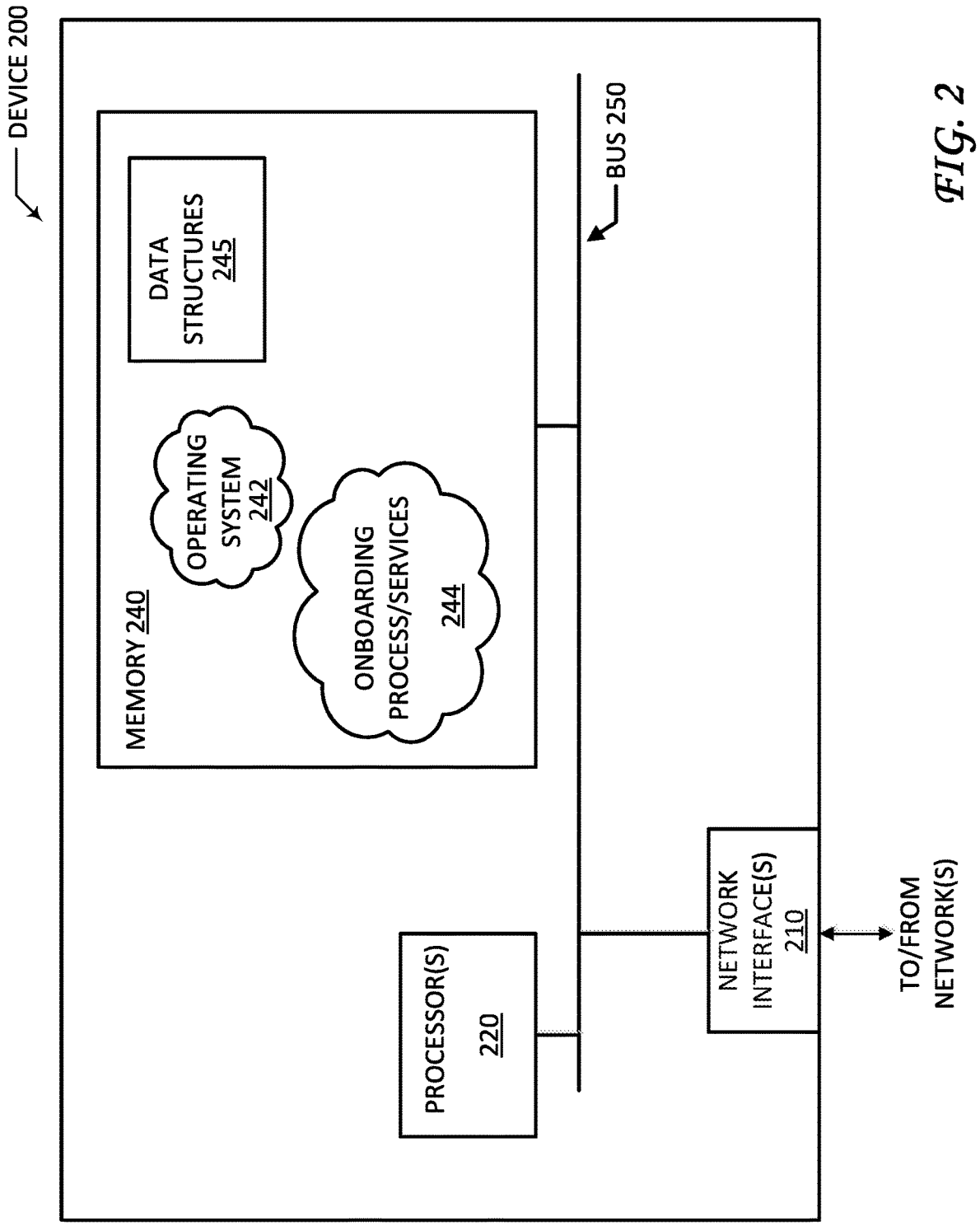
FIG. 2 illustrates an example device for performing the onboarding techniques disclosed herein.

FIG. 2 is a schematic block diagram of an example device 200 (e.g., an onboarding server, etc.) that may be used with one or more embodiments described herein. Device 200 may comprise one or more network interfaces 210 (e.g., wired, wireless, PLC, etc.), at least one processor 220, and a memory 240 interconnected by a system bus 250.

Device 200 may comprise one or more network interfaces 210, at least one processor 220, and a memory 240 interconnected by a system bus 250. Network interface(s) 210 contain the mechanical, electrical, and signaling circuitry for communicating data over links coupled to one or more of the networks shown in communication environment 100. Network interfaces 210 may be configured to transmit and/or receive data using a variety of different communication protocols, as will be understood by those skilled in the art.

Memory 240 comprises a plurality of storage locations that are addressable by processor 220 for storing software programs and data structures associated with the embodiments described herein. Processor 220 may comprise necessary elements or logic adapted to execute the software programs and manipulate data structures 245. An operating system 242, portions of which are typically resident in memory 240 and executed by processor 220, functionally organizes the device by, inter alia, invoking operations in support of software processes and/or services executing on the device. These software processes and/or services may comprise an illustrative "onboarding" process/service 244, as described herein. Note that while process/service 244 is shown in centralized memory 240, some embodiments provide for these processes/services to be operated in a distributed computing network.

It will be apparent to those skilled in the art that other processor and memory types, including various computer-readable media, may be used to store and execute program instructions pertaining to the techniques described herein. For example, the techniques described herein may be performed by hardware, software, and/or firmware, such as in accordance with the illustrative onboarding process 244, which may contain computer executable instructions executed by the processor 220 to perform functions relating to the techniques described herein. Also, while this disclosure describes various processes, it is expressly contemplated such processes may be embodied as modules configured to operate in accordance with the techniques herein (e.g., according to the functionality of a similar process). Further, while the processes have been shown separately, those skilled in the art will appreciate that processes may be routines or modules within other processes. For example, processor 220 can include one or more programmable processors, e.g., microprocessors or microcontrollers, or fixed-logic processors. In the case of a programmable processor, any associated memory, e.g., memory 240, may be any type of tangible processor readable memory, e.g., random access, read-only, etc., that is encoded with or stores instructions that can implement program modules. Processor 220 can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform the functions described herein.

As noted above, authentication remains a persistent technical problem in our modern information age. In the context of multifactor authentication, challenges arise when balancing cost, complexity, convenience, scalability, and overall security. For example, although employing multiple authentication factors may improve security, each additional factor may also increase an overall system complexity, which, in turn, may limit system scalability. While some manufacturers employ hardware based solutions for registering and authenticating devices (e.g., chip level identity packages, secure unique device identifiers certificate and certificate chains, etc.), current deployments of client devices may include legacy and/or non-compatible devices that do not support such hardware based solutions.

Accordingly, the techniques disclosed herein provide security mechanisms to onboard a variety of devices using multifactor authentication, which includes determining trust scores and generating signed certificates. In addition, the techniques herein support onsite applications (e.g., mobile devices) for registering applicant devices as well as dashboard driven trust scores that support initial (e.g., first-time) registrations based on device characteristics, deployment environment (e.g., network topology) information, and the like. After initial registration, the techniques also provide certificate signing request (CSR) processes, initiated by registered devices, for ongoing and seamless communications.

Figure 3:
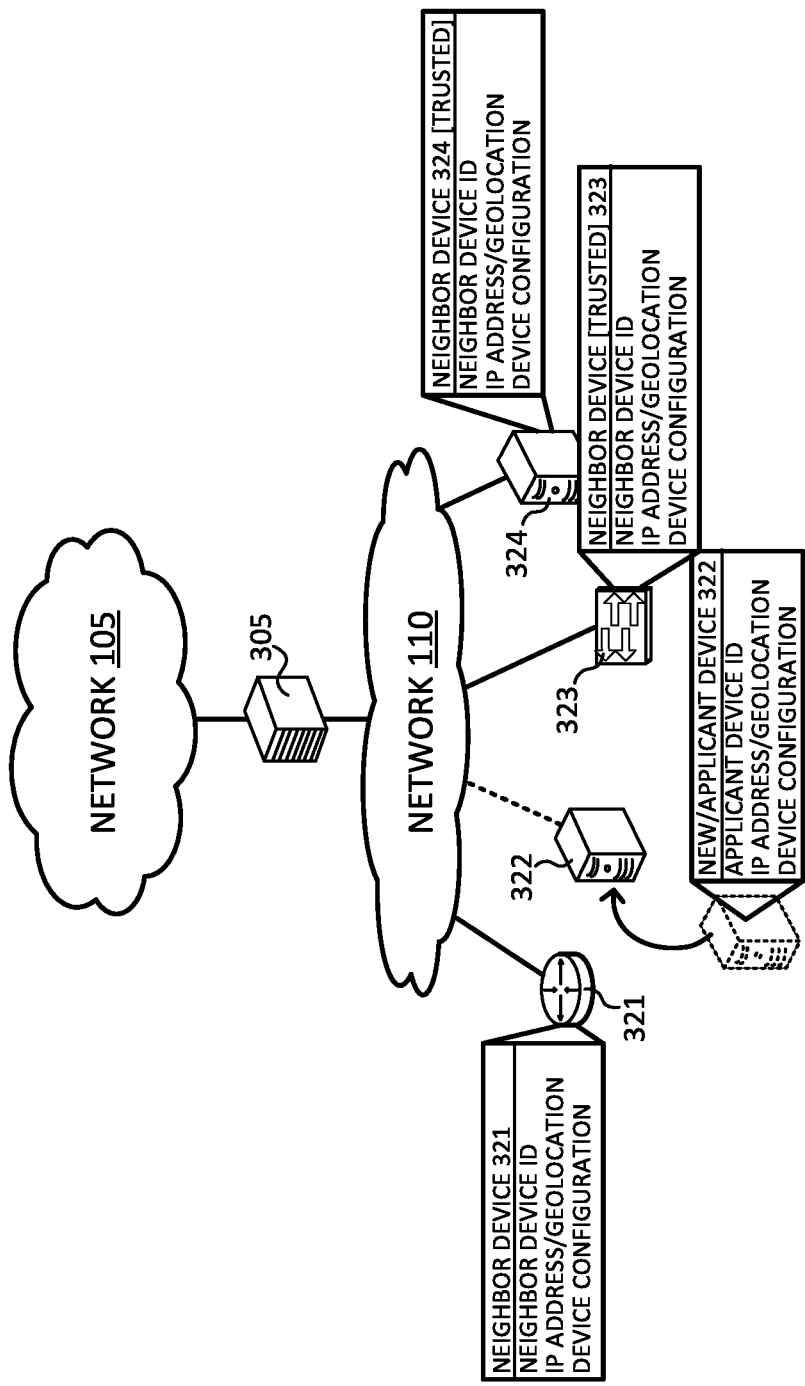
FIG. 3 illustrates another communication environment, showing various applicant devices and an onboarding server.

FIG. 3 illustrates another example communication environment 300 for performing onboarding processes according to one or more embodiments of this disclosure. Communication environment 300 includes network 105 (e.g., a data center network), network 110 (e.g., local or client side network), and an onboarding server 305. Onboarding server 305 can represent device 200 (and/or component features thereof). Communication environment also illustrates various client devices, including client devices 321, 322, 323, and 324.

Onboarding server 305 may include a Plug-n-Play (PnP) server operable to collect multiple data points about client devices 321-324 in their respective environment and translate such data points into an overall trust score. This trust score provides a confidence measure based on various factors which will be used by, for example, a network administrator (e.g., using a central onboarding dashboard, a mobile application, etc.) or an automatic process to make a decision whether or not to trust certain devices (e.g., when the overall trust score exceeds a threshold value).

As shown, the client devices 321-324 can include switches, routers, servers, and the like. In addition, client device 322 represents a new or applicant device that attempts to initially establish a secure communication channel for communicating with or otherwise accessing network resources in network 105 (e.g., data center resources). Onboarding server 305 evaluates information corresponding to client device 322 as well as information regarding the environment around or about client device 322. For example, onboarding server 305 collects an applicant device ID, an IP address/geolocation based on the IP address, and device configuration information corresponding to client device 322. In addition, onboarding server 305 also collects environment information in which client device 322 operates. This environment information includes, for example, neighbor device information corresponding to client devices 321, 323 and 324, including neighbor device IDs, IP addresses/geo-locations, and respective device configurations.

Figure 4:
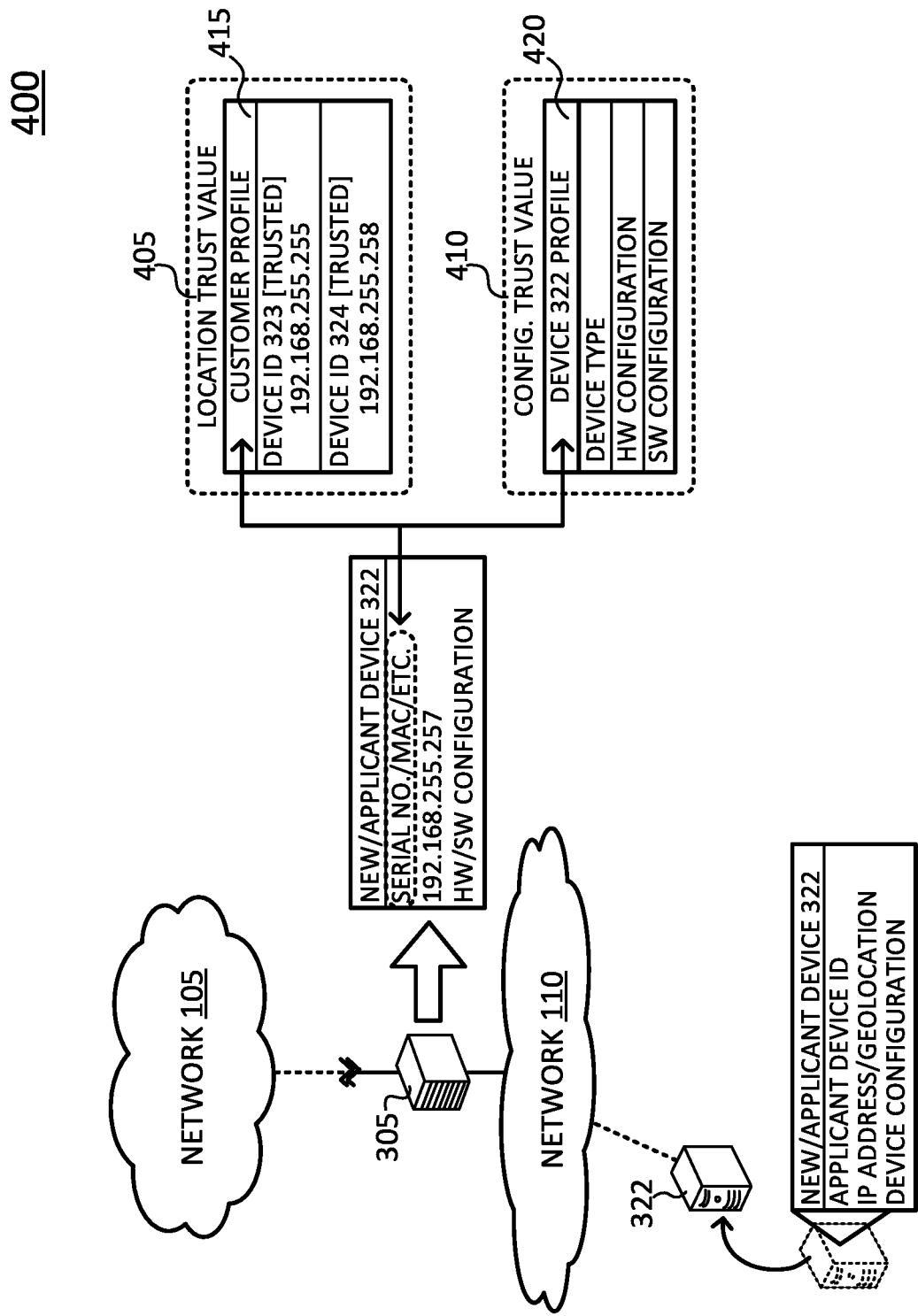
FIG. 4 illustrates the communication environment of FIG. 3, showing the onboarding server operatively determining a location trust value and a configuration trust value for one of the client devices.

FIG. 4 illustrates a schematic diagram 400, showing a process to determine a location trust value 405 and a configuration trust value 410 for client device 322. In operation, onboarding server 305 receives the applicant device ID (e.g., a serial number, a media access control (MAC) address, other device specific identifiers, etc.) and, based on the device ID, determines a customer profile 415 as well as an expected device configuration—e.g., here, a profile 420, which includes expected configuration parameters associated with client device 322. For example, onboarding server 305 may access a database of customer accounts with individual customer profiles, where each customer profile includes a list of registered/trusted devices and registered/trusted device information. As shown, the customer profile 415 includes registered/trusted device information for client devices 323 and 324 (and includes device identifiers and respective IP addresses (or geolocations)).

Onboarding server 305 further determines the geolocations and/or IP ranges for registered/trusted devices associated with customer profile 415 and compares these geolocations/IP ranges to an IP address/geolocation for client device 322. In addition, onboarding server 305 determines location trust value 405 based on a nearness or proximity (e.g., geolocation proximity) between client device 322 and registered/trusted client devices 323 and 324. As shown, the IP address for client device 322 is within the IP address ranges for client devices 323 and 324, which corresponds to an increased level or trust, or an increased location trust value 405. In contrast, an IP address (or geolocation) for client device 322 outside the IP address ranges (or located at a distant or unexpected geographic location) indicates a decreased level of trust or a decreased location trust value 405 (or may even result in a null or 0 value). In this fashion, onboarding server 305 compares actual location information for client device 322 to other known locations of trusted/registered neighboring devices for the same customer, thereby helping to ensure client device 322 is physically present at or near an expected location (and not a rogue device attempting to hack into network 105).

With respect to determining a configuration trust value 410, onboarding server 305 determines expected configuration parameters (e.g., hardware components/software components/etc.) for client device 322 based on the applicant device ID. For example, onboarding server 305 can access a database of configuration parameters associated with device identifiers (e.g., manufacturing serial numbers, etc.), where each device identifier is matched to configuration parameters such as device type, manufacturer, a number of processors, types of memory, storage capacity, add-on modules, software configurations/modules, operating systems/versions, base licensing information, port capacity, and the like. Onboarding server 305 compares the expected configuration parameters with the actual configuration parameters received from client device 322 to determine configuration trust value 410. In operation, matching configuration parameters correspond to an increased level of trust, or an increased configuration trust value 410, while non-matching configuration parameters correspond to a decreased level of trust, or a decreased configuration trust value 410.

Figure 5:
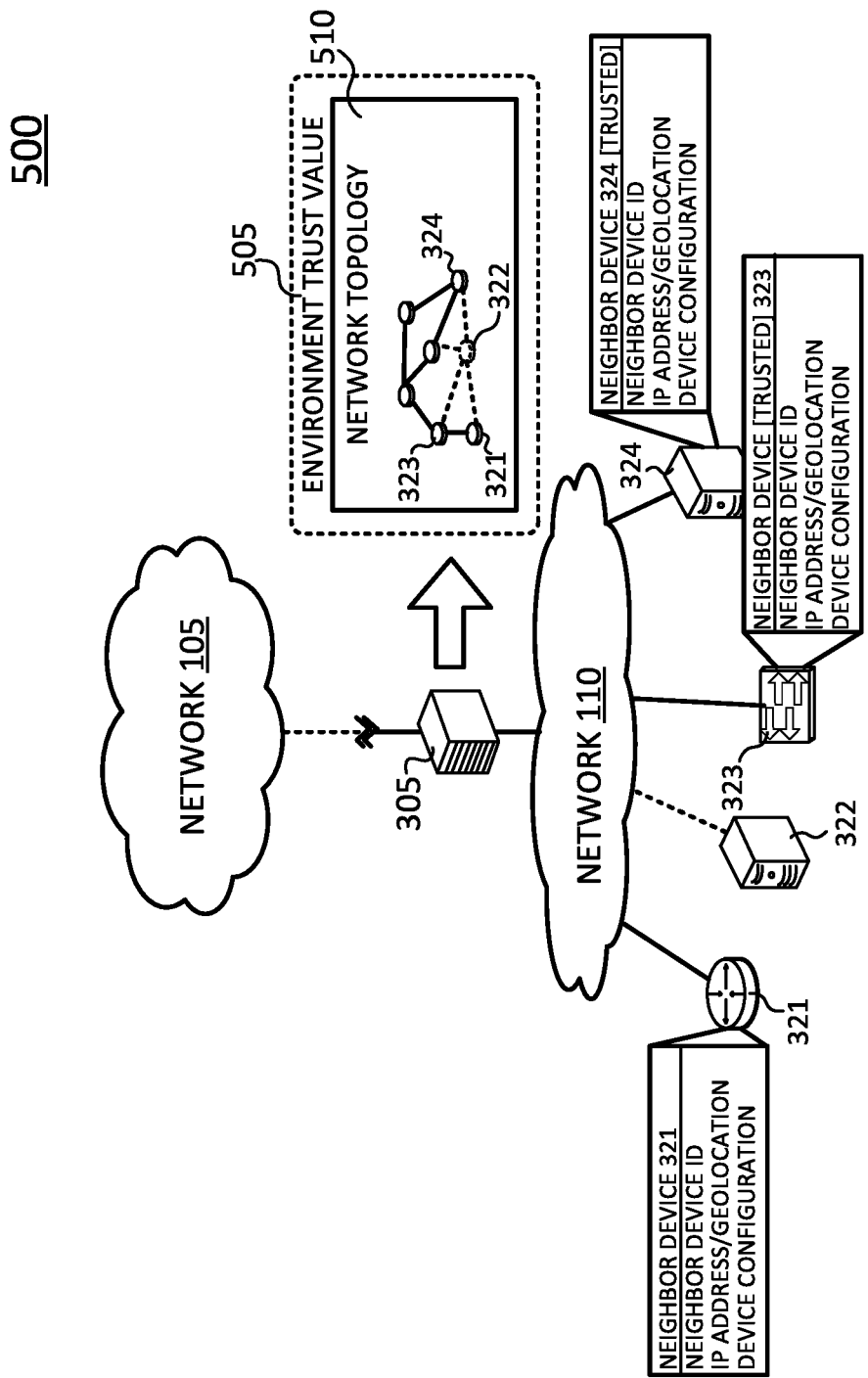
FIG. 5 illustrates the communication environment of FIG. 3, showing the onboarding server operatively determining an environment trust value for one of the client devices.

FIG. 5 illustrates a schematic diagram 500, showing a process to determine an environment trust value 505 for client device 322. In operation, onboarding server 305 uses a network discovery protocol (e.g., neighbor discovery, Cisco discovery, inverse neighbor discovery, secure neighbor discovery, and so on) to determine devices neighboring with or connected to client device 322. In this fashion, onboarding server 305 can determine a network topology for devices proximate to client device 322. Once discovered, onboarding server 305 may determine neighbor device information (e.g., serial numbers, types of devices, etc.) and verify such information with customer profiles and trusted/registered devices (e.g., for a deployment site, etc.), as discussed above. Here, onboarding server 305 increases environment trust value 505 for neighboring devices cross-verified with trusted/registered devices for a customer site and decreases environment trust value 505 for non-matching devices.

Figure 6:
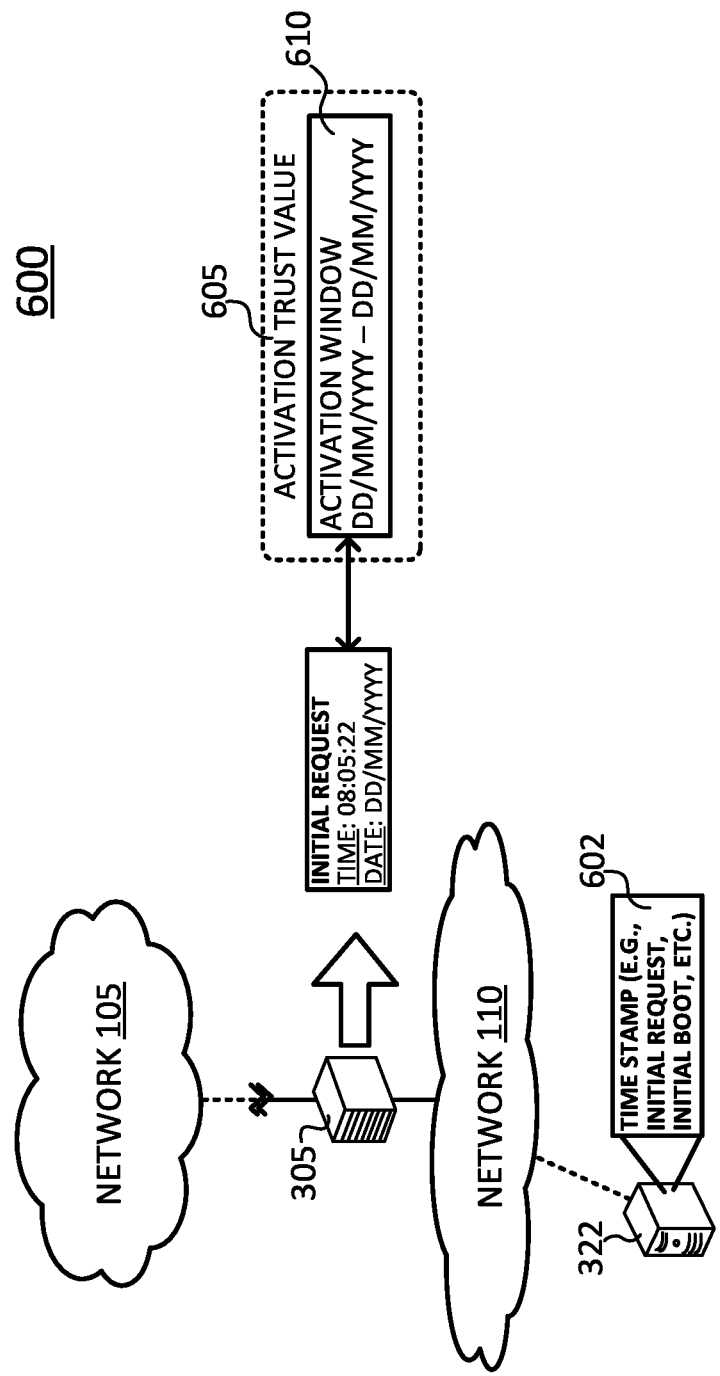
FIG. 6 illustrates the communication environment of FIG. 3, showing the onboarding server operatively determining an environment trust value for one of the client devices.

FIG. 6 illustrates a schematic diagram 600, showing a process to determine an activation trust value 605 for client device 322. In one embodiment, onboarding server 305 receives time stamp 602, which represents the time information when client device 322 sends an initial request (e.g., a certificate signing request (CSR), etc.) to onboarding server 305. Onboarding server 305 also determines a system "up-time" for client device 322, which represents time information corresponding to when the client device was booted up. As is appreciated by those skilled in the art, client device 322 may provide the system up-time to onboarding server 305 in response to a request, or by other request/response mechanisms. Onboarding server 305 determines a time difference between the system up-time and time stamp 602 and compares such time difference to an activation window 610 (e.g., an authorized activation time-period). Activation window 610 represents a threshold window of time between client device 322 booting up and sending the initial request. Onboarding server 305 increases activation trust value 605 when the time difference is within activation window 610, and decreases activation trust value 605 when the time difference is outside of activation window 610.

In another embodiment, activation window 610 may represent an absolute time or time-period, within which client device 322 must send its initial request to onboarding server 305. As is appreciated by those skilled in the art, customers who purchase network equipment often setup such equipment at a customer site within a specified time-period. Such time-period may be based on a customer schedule and/or it may be coordinated with the manufacturer (or 3$^{rd}$ party seller). As shown, activation window 610 can represent the time-period within which a customer is expected to activate or setup client device 322. In operation, onboarding server 305 receives the initial onboard request, determines the initial request time (e.g., based on time stamp 602), and compares the initial request time to activation window 610. Here, onboarding server 305 increases activation trust value 605 when the time stamp associated with the initial request falls within activation window 610 and decreases activation trust value 605 when the time stamp associated with the initial request falls outside activation window 510.

Figure 7:
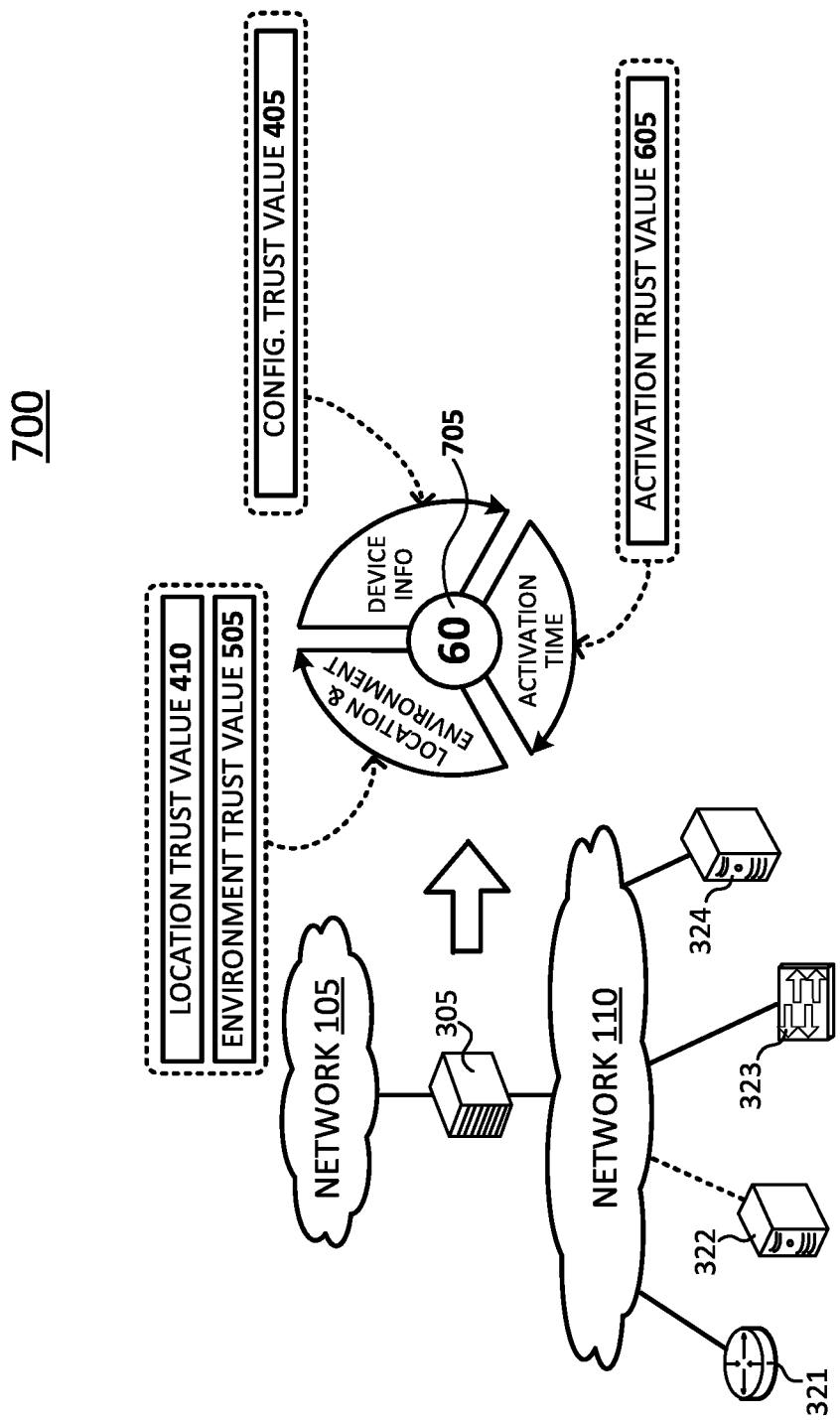
FIG. 7 illustrates the communication environment of FIG. 3, showing the onboarding server operatively determining an overall trust score for one of the client devices.

FIG. 7 illustrates a schematic diagram 700, showing a process to combine multiple trust values into a comprehensive trust score 705. As discussed above, onboarding server 305 determines the various trust values, including location trust value 405, configuration trust value 410, environment trust value 505, and activation trust value 605. Onboarding server 305 further compiles or aggregates these trust values into a single trust score 705, which is represented by a number "60", e.g., on a scale of 0-100, where 0 is untrustworthy and 100 is trustworthy. While onboarding server 305 determines trust score 705 as a numerical value on a particular scale, it is appreciated, any value, metric, or scale may be used to represent trustworthiness or untrustworthiness for trust score 705 (e.g., numbers, percentages, colors, charts, diagrams, etc.). In addition, it is also appreciated that individual trust scores may (or may not) be dispositive ultimate determinations to trust (or not trust) an applicant device. Moreover, some trust values may be emphasized over others by employing weights, ranks, priorities, and the like, as is appreciated by those skilled in the art. In this fashion, trust score 705 provides a confidence measure based on various factors which can be used in an automatic onboarding process (e.g., based on some predetermined criteria) or evaluated by a network administrator using a central onboarding dashboard (or mobile application).

Referring collectively FIGS. 3-7, onboarding server 305 operates to evaluate information corresponding to client device 322 (as well as other information regarding the environment around/about client device 322), determine trust values (e.g., location trust value 405, configuration trust value 410, environment trust value 505, activation trust value 605, etc.), and generate a trust score (e.g., trust score 705) based on the same. In some embodiments, a network administrator (or a user with appropriate privileges) evaluates the trust score to determine if client device 322 is trustworthy while in other embodiments, onboarding server 305 may automatically make such determinations based on some predetermined trust criteria (e.g., threshold values, etc.). Once trusted, client device 322 and onboarding server 305 establish a secure communication channel, which provides access to and allows client device 322 to join a management system as well as other parts of the network.

FIGS. 8A-8D collectively illustrate signaling diagrams 801-804, showing call flows or messages sent between network devices during the onboarding processes described herein. For purposes of discussion herein, certain flows or messages common amongst signaling diagrams 801-804 are generally referenced by the same number and are discussed when initially presented.

Figure 8A:
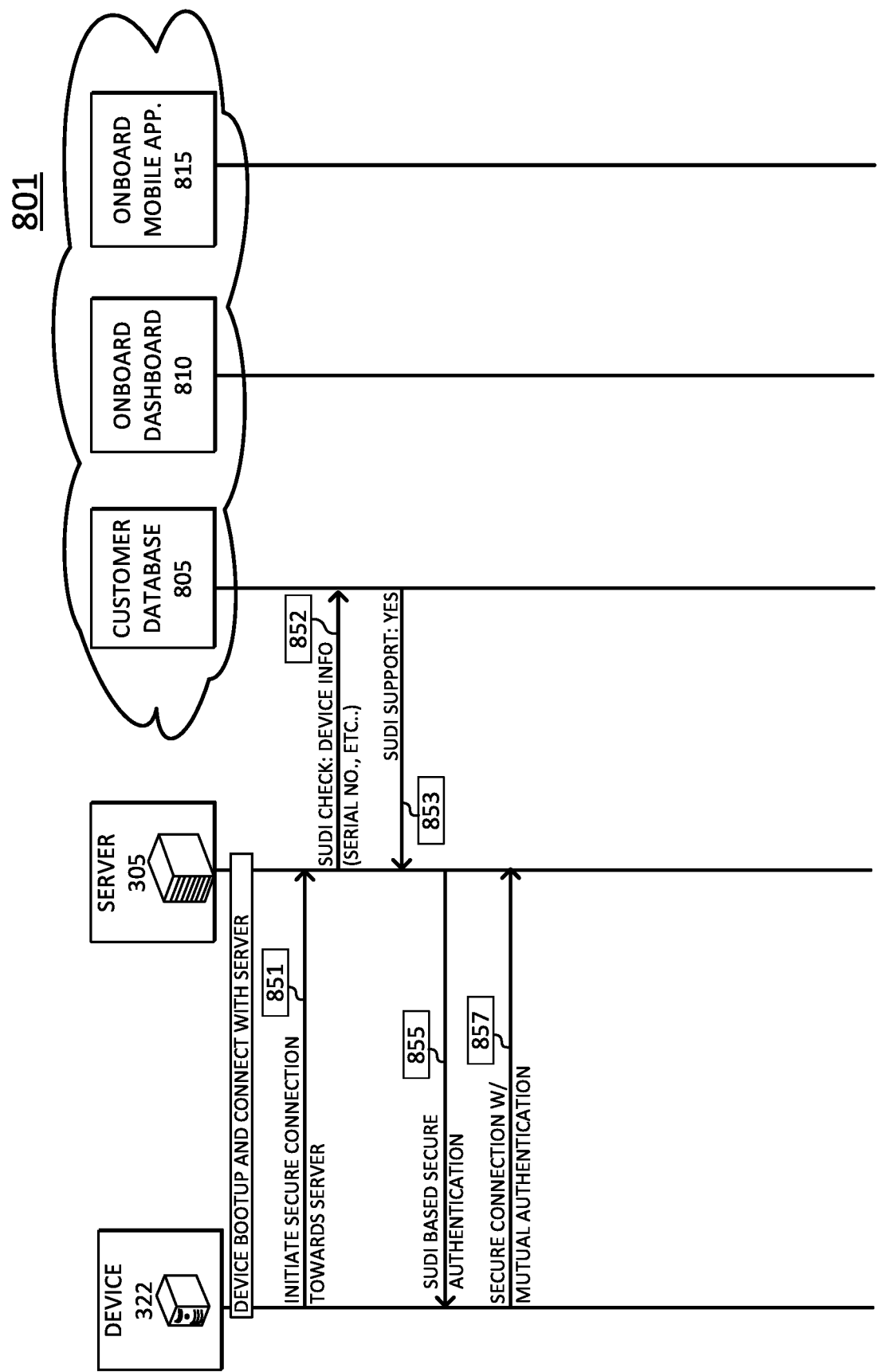
FIG. 8A illustrates a signaling diagram for onboarding an applicant device, showing signal flows for an applicant device that has a secure unique device identifier.

FIG. 8A in particular illustrates a signaling diagram 801, showing a baseline process to onboard a device when client device 322 has a secure unique device identifier (SUDI) (e.g., a built-in SUDI certificate based on a specific hardware trust module). As shown, client device 322 boots up attempts to connect to a PnP server service (e.g., access network resources such as those shown in network 105) through onboarding server 305. Client device 322 initiates a secure connection toward the server at step 851, and in response, onboarding server 305 performs a SUDI check with a customer database 805. Customer database 805 represents a database inventory that maps device serial numbers, customer profiles (e.g., customer accounts), and PnP account information. Since client device 322 has a valid SUDI, customer database indicates the SUDI is supported at step 853. Onboarding server 305 and client device 322 perform mutual authentication to establish a secure communication channel using a stored certificate—shown by steps 855, SUDI based secure authentication and 857, secure connection with mutual authentication. However, as discussed above, in some instances, some devices may not be SUDI compatible (e.g., may not use appropriate hardware chips, etc.).

Figure 8B:
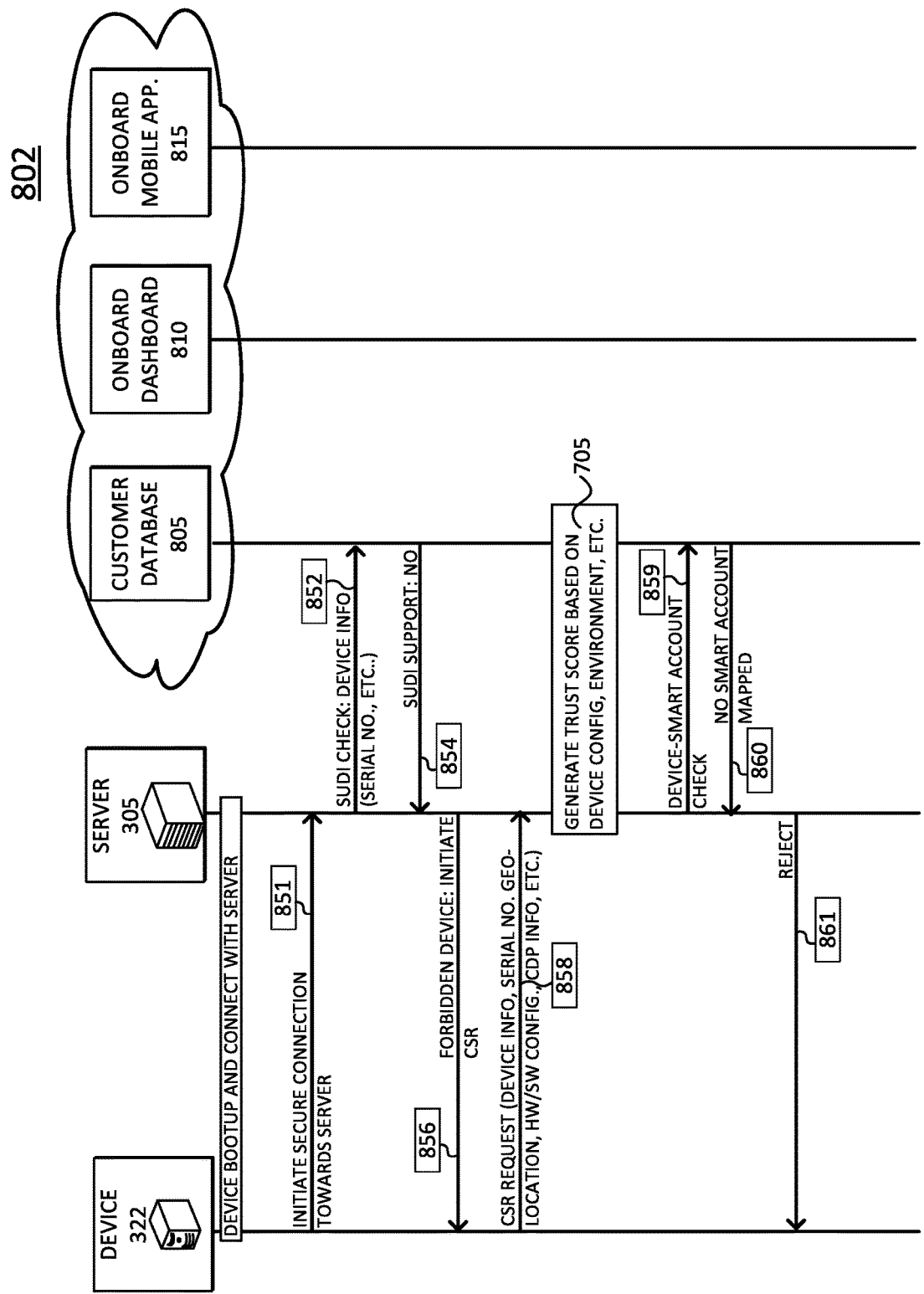
FIG. 8B illustrates a signaling diagram for onboarding an applicant device, showing signal flows for an applicant device that does not have the secure unique device identifier nor an associated customer account.

FIG. 8B illustrates a signaling diagram 802, showing a non-SUDI onboarding processes, where client device 322 provides additional information to onboarding server 305 and attempts authentication using a certificate signing request (CSR). As shown, after initial boot-up, client device 322 follows steps 851 and 852. However, in step 854, customer database 805 indicates SUDI authentication is unsupported. In response, onboarding server 305 sends a forbidden device message in step 856, which triggers a CSR from client device 322 in step 858. Onboarding server 305 receives the CSR as well as additional information such as a device identifier (e.g., serial number, MAC address), an IP address, geolocation information, hardware/software configuration information, neighbor device information (e.g., using Cisco Discovery Protocol, etc.), and the like. Onboarding server 305 generates a trust score based on various trust values (e.g., configuration trust value 405, location trust value 410, environment trust value 505, and activation trust value 605), discussed above. Onboarding server 305 further checks with customer database 805, at step 859, for customer account information associated with client device 322. However, customer database 805 indicates, at step 860, no customer account (e.g., "no smart account mapped") is associated with client device 322. Without an associated customer account, onboarding server 305 rejects, at step 861, the CSR.

Figure 8C:
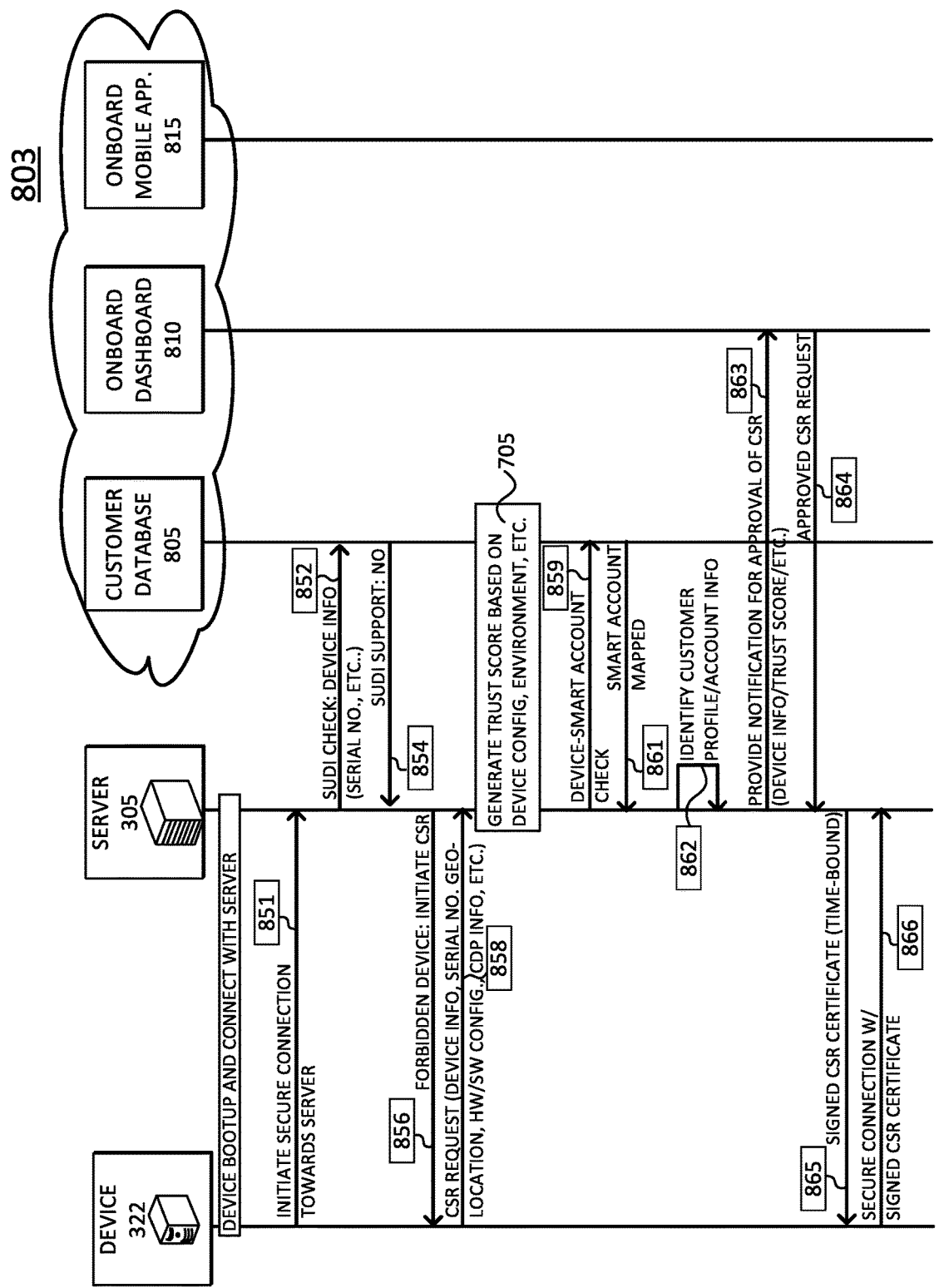
FIG. 8C illustrates a signaling diagram for onboarding an applicant device, showing signal flows for an applicant device using an onboard dashboard.

FIG. 8C illustrates a signaling diagram 803, showing another non-SUDI onboarding process, where client device 822 is associated with a customer account (e.g., "smart account"). While signaling diagram 802 provides signal flows that describe onboarding server 305 generating trust score 705, checking customer database for customer account information (step 859), and receiving an indication (step 860) no customer account is associated with client device 322, signaling diagram 803 describes signal flows when a customer account is associated with client device 322. In particular, as shown at step 861, customer database 805 indicates client device 822 is associated with a customer account—here, "smart account mapped". After customer database 805 identifies the customer account, onboarding server 305 determines, in step 862, the customer profile/ account information and sends, in step 863, an approval notification to an onboard dashboard 810. Onboard dashboard 810 provides an interface to a user (e.g., network administrator, etc.) and displays approval notifications, device information, trust scores, and the like. A network administrator (or a user with appropriate privileges) accesses onboard dashboard 810 to evaluate devices and approve or deny CSRs based on respective trust scores. Here, the network administrator uses dashboard 810 to approve the CSR request in step 864. In response, onboarding server 305 sends, in step 865, a signed CSR certificate (e.g., a time-bound CSR) to client device 322. Client device 322 establishes a secure communication channel with onboarding server 305 using the signed CSR certificate in step 866.

Notably, in some embodiments, onboarding server 305 may skip step 863 (e.g., sending an approval notification to an onboard dashboard 810) and instead, determine the device is trustworthy based on some predetermined criteria. For example, onboarding server 305 can evaluate the trust score for a device and/or for specific devices identified by a serial number, etc. The onboarding server 305 further compares the trust score for the device (or specific devices) against a predetermined threshold value. In this fashion, for large-scale deployments, an onboarding server may automatically approve certain devices without requiring manual approval, intervention, or further user input by onboard dashboard 810.

In addition, signaling diagram 803 also illustrates an initial or first time approval/authentication process. It is appreciated, however, after performing this initial process, client device 322 can use the signed certificate on an ongoing basis without requiring the same initial information burden.

Figure 8D:
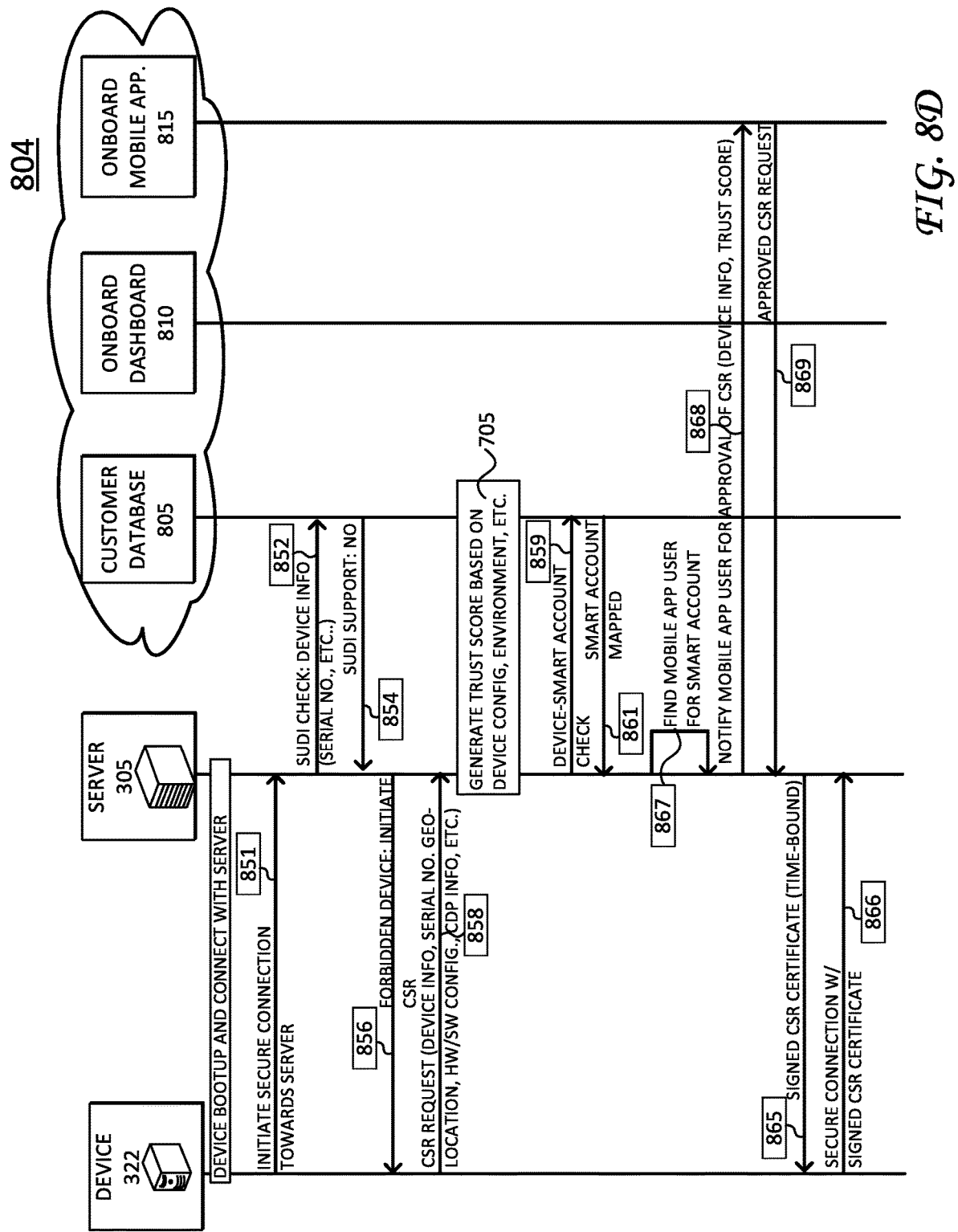
FIG. 8D illustrates a signaling diagram for onboarding an applicant device, showing signal flows for an applicant device using a mobile application.

FIG. 8D illustrates a signaling diagram 804, showing an onboarding process using a mobile application—e.g., onboard mobile application 815. Similar to signaling diagram 803, discussed above, signaling diagram 804 illustrates operations and signal flows between client device 322, onboarding server 305, and customer database 805. However, after customer database 805 indicates a customer account is associated with client device 322 (step 861— "smart account mapped"), onboarding server 305 further identifies, in step 867, a mobile application user for the customer account and further notifies, in step 868, onboard mobile application 815 (e.g., the mobile application user) to evaluate the CSR. Onboard mobile application 815 may provide, for example, a display notification on a mobile device similar to the notifications shown by onboard dashboard 810.

Here, the user approves the CSR request at step 869, and in response, onboarding server 305 sends, in step 865, a signed CSR certificate (e.g., a time-bound CSR) to client device 322. Client device 322 establishes a secure communication channel with onboarding server 305 using the signed CSR certificate in step 866. Signaling diagram 804 generally illustrates notification and authorization by a mobile application. Typically, the mobile device is used by an administrator/installer the mobile application. The mobile device connects to onboarding server 305, which authenticates the user with role-based access control and multifactor web authentication mechanisms.

In addition, for onsite personnel, the administrator/installer can use onboard mobile application 815 to manually validate client device 322 by physically connecting to the device, scanning a device identification tag (e.g., RFID tag, etc.), or performing a network scan using onboard mobile application 815 while onsite/connected to a local network. For example, the mobile application may employ a layer 3 application (e.g., mDNS) that broadcasts a rotating secure ID. The locally connected mobile application can be linked to a central cite, which can confirm the broadcast matches what the mobile application sees. With both devices on the same network and physically present, the installer can trust the credentials, and thus, the applicant device.

Collectively, FIGS. 8A-8D illustrate onboarding processes described by call flows or messages sent between network devices when, for example, an applicant device has a built in secure unique device identifier (SUDI) (signaling diagram 801), an applicant device does not have a SUDI nor is the applicant device associated with customer account information (signaling diagram 802), an applicant device is associated with customer account information and notifications are sent to an onboard dashboard (signaling diagram 803) or sent to an onboard mobile application (signaling diagram 804).

FIGS. 8A-8D collectively illustrate signaling diagrams 801-804, showing call flows or messages sent between network devices during the onboarding processes described herein. It should be noted that certain steps within signaling diagrams 801-804 may be optional, and further, the steps shown in FIGS. 8A-8D are merely examples for illustration—certain other steps may be included or excluded as desired. Further, while a particular order of the steps is shown, this ordering is merely illustrative, and any suitable arrangement of the steps may be utilized without departing from the scope of the embodiments herein.

FIG. 9 illustrates a schematic diagram of an example onboard dashboard display 900, showing applicant devices, indicated by applicant device identifiers 910, respective status 915 (e.g., "trusted" or "untrusted"), and an action menu 920 (e.g., "approve CSR" or "deny CSR"). Onboard dashboard display 900 may represent a graphical interface used by, for example, onboard dashboard 810 and/or onboard mobile application 815. In general, as discussed above, trust scores, such as the illustrated trust score 925, are determined based on a host of trust values, including an environment trust value, an activation trust value, a location trust value, a configuration trust value, and/or combinations thereof. In addition, in some embodiments, onboard dashboard 810 may provide a manual override interface to an otherwise automatic approval/denial process, where an onboarding server (e.g., onboarding server 305) automatically approves/denies CSRs from applicant devices based on predetermined criteria (as discussed above).

Figure 10:
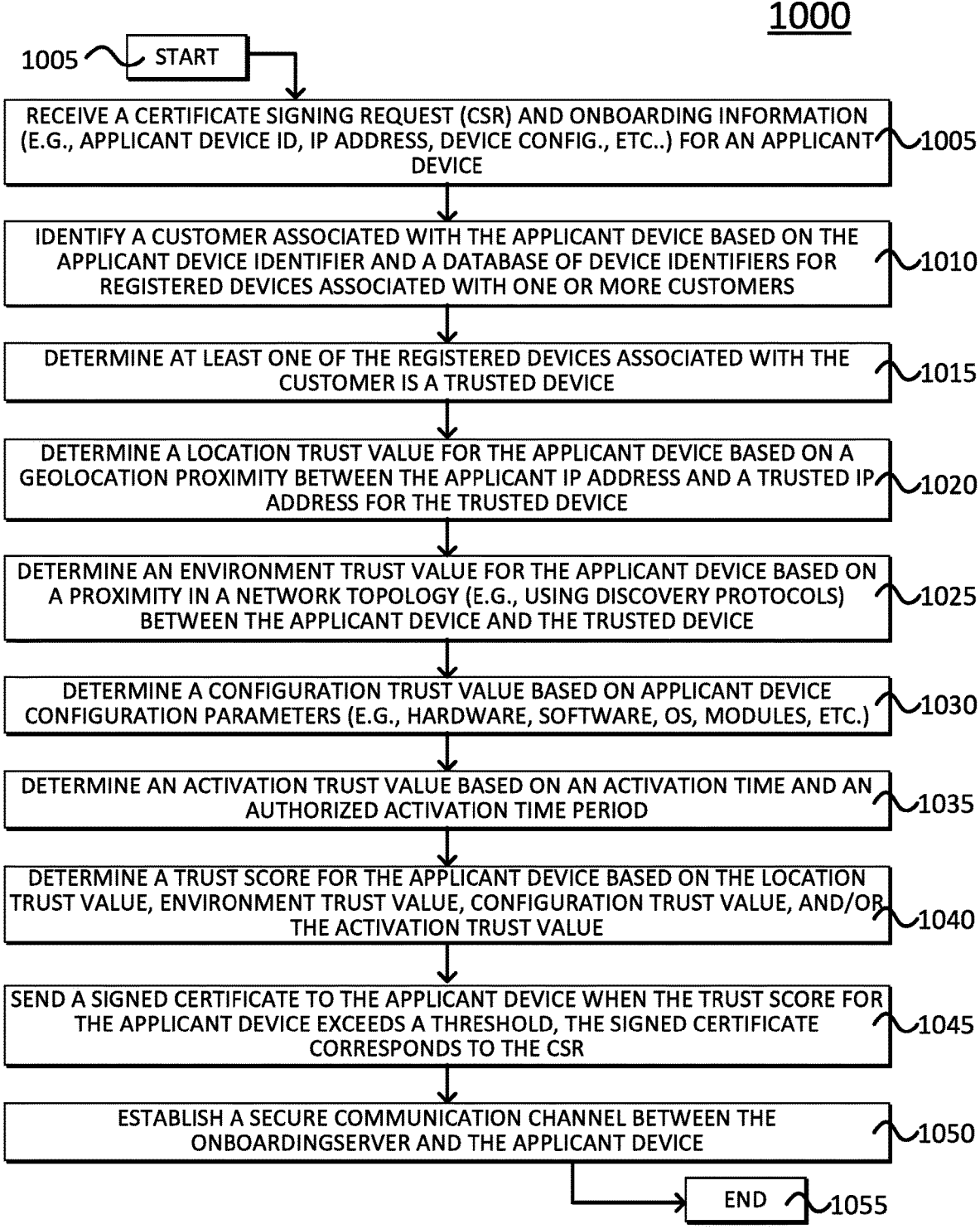
FIG. 10 illustrates an exemplary simplified procedure for onboarding an applicant devices, particularly from the perspective of the onboarding server shown in FIG. 3.

FIG. 10 an example simplified procedure 1000 for onboarding an applicant device, particularly from the perspective of an onboarding server (e.g., onboarding server 305).

Procedure 1000 begins at step 1005 and continues on to step 1010 where, as discussed above, the onboarding server receives a certificate signing request (CSR) as well as onboarding information for an applicant device. As discussed above, the onboarding information typically includes applicant device identifier (e.g., serial number, MAC, etc.), an Internet Protocol (IP) address, device configuration parameters (e.g., hardware, software, etc.), and the like.

Next, in step 1010, onboarding server identifies a customer associated with the applicant device (e.g., a smart account, etc.) based on the applicant device identifier. For example the onboarding server communicates with a database of device identifiers for registered devices associated with one or more customers and matches the applicant device identifier to one of the customers. The onboarding server also determines, in step 1015, one of the registered devices associated with the customer is a trusted device and determines a location trust value for the applicant device, in step 1020, based on a geolocation proximity between the applicant IP address and a trusted IP address for the trusted device.

In addition, the onboarding device also determines an environment trust value, in step 1025 for the applicant device based on a proximity in a network topology (e.g., using discovery protocols to discover neighboring devices) between the applicant device and the trusted device.

The onboarding server further determines, in step 1030, a configuration trust value based on applicant device configuration parameters (e.g., hardware, processors, memory, software, operating systems, service modules, etc.). For example, the onboarding server may lookup expected device configurations for the applicant device and compare such expected device configurations to actual device configurations provided by the applicant device and/or provided by neighboring devices that communicate with the applicant device.

In step 1035, the onboarding server determines an activation trust value based on an activation time and an authorized activation time-period. For example, as discussed above, the onboarding server can compare a time between device boot-up and the CSR request and/or compare a time stamp associated with the CSR request and an activation window (e.g., a time period) for onboarding the applicant device.

The onboarding server evaluates the various trust values, e.g., the location trust value, the environment trust value, the configuration trust value and/or the activation trust value, to determine, in step 1040, an overall trust score for the applicant device. As discussed above, the trust score can be displayed on a dashboard or other user interface (e.g., mobile application, etc.) for user approval. In some embodiments, however, the onboarding server may make an automatic determination to trust (or deny) the applicant device based on the trust score exceeding some predetermined criteria/value. Once trusted, the onboarding server sends, in step 1045, a signed certificate (CSR) to the applicant device and establishes, in step 1050, a secure communication channel with the applicant device. Procedure 1000 subsequently ends in step 1055, but may continue on to step 1010 where, as discussed above, the onboarding server receives a certificate signing request (CSR) from an applicant device.

It should be noted that certain steps within procedure 1000 may be optional, and further, the steps shown in FIG. 10 are merely examples for illustration—certain other steps may be included or excluded as desired. Further, while a particular order of the steps is shown, this ordering is merely illustrative, and any suitable arrangement of the steps may be utilized without departing from the scope of the embodiments herein. In addition, although procedure 1000 is described with respect to an onboarding server, certain operations may be executed by devices or modules running by a distributed network of devices.

The techniques herein provide a mechanism to enable onboarding applicant devices and leverage multiple novel factors/criteria/inputs (e.g., individual trust values, overall trust scores, etc.). These techniques provide a secure and scalable solution to onboarding a large number of devices based on predetermined criteria. The techniques are flexible and can employ automatic approval policies or may also employ a simplified and easy to understand interface (e.g., a dashboard), which can be used to manually approve devices.

While there have been shown and described illustrative embodiments and processes executed by an onboarding server, it is to be understood that various other adaptations and modifications may be made within the spirit and scope of the embodiments herein. For example, the embodiments have been shown and described herein with relation to one onboarding server; however, the embodiments in their broader sense are not as limited, and may, in fact, be used with any number of servers, devices, systems, and the like.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method, comprising:
receiving, by a server, a certificate signing request (CSR) and onboarding information for an applicant device, the onboarding information includes at least an applicant device identifier and an applicant Internet Protocol (IP) address;
identifying, by the server, a customer associated with the applicant device based on the applicant device identifier and a database of device identifiers for registered devices associated with one or more customers;
determining, by the server, at least one of the registered devices associated with the customer is a trusted device;
determining, by the server, a location trust value for the applicant device based on a geolocation proximity between the applicant IP address and a trusted IP address for the trusted device;
determining, by the server, an environment trust value for the applicant device based on a proximity in a network topology between the applicant device and the trusted device;
determining, by the server, a trust score for the applicant device based on the location trust value and the environment trust value;
determining the applicant device is an additional trusted device when the trust score for the applicant device exceeds a threshold;
sending a signed certificate to the applicant device when the trust score for the applicant device exceeds the threshold, the signed certificate corresponds to the CSR; and
establishing a secure communication channel between the server and the applicant device when the trust score exceeds the threshold.

2. The method of claim 1, wherein the onboarding information further comprises actual configuration parameters, the method further comprising:
identifying expected configuration parameters for the applicant device based on the applicant device identifier; and
comparing the actual configuration parameters with the expected configuration parameters to determine a configuration trust value, and
wherein determining the trust score further comprises determining the trust score for the applicant device based on the location trust value, the environment trust value, and the configuration trust value.

3. The method of claim 2, wherein the actual configuration parameters and the expected configuration parameters correspond to one or more hardware components or software components.

4. The method of claim 1, wherein the CSR is associated with an activation time, the method further comprising:
comparing the activation time to an authorized activation time period to determine an activation trust value, and
wherein determining the trust score further comprises determining the trust score for the applicant device based on the location trust value, the environment trust value, and the activation trust value.

5. The method of claim 1, wherein determining the environment trust value further comprises:
discovering one or more neighbor devices in proximity to the applicant device; and
determining at least one neighbor device is the trusted device based on a device identifier for the at least one neighbor device and the database of device identifiers for registered devices associated with one or more customers.

6. The method of claim 1, wherein the applicant device identifier includes at least one of a media access control address (MAC) address or a serial number.

7. The method of claim 1, further comprising:
displaying the trust score to a network administrator; and
receiving an input by the network administrator that indicates the applicant device is the additional trusted device when the trust score for the applicant device exceeds the threshold.

8. A device, comprising:
one or more network interfaces to communicate in a network;
a processor coupled to the network interfaces and adapted to execute one or more processes; and
a memory configured to store a process executable by the processor, the process, when executed, is operable to:
receive a certificate signing request (CSR) and onboarding information for an applicant device, the onboarding information includes at least an applicant device identifier and an applicant Internet Protocol (IP) address;
identify a customer associated with the applicant device based on the applicant device identifier and a database of device identifiers for registered devices associated with one or more customers;
determine at least one of the registered devices associated with the customer is a trusted device;
determine a location trust value for the applicant device based on a geolocation proximity between the applicant IP address and a trusted IP address for the trusted device;
determine an environment trust value for the applicant device based on a proximity in a network topology between the applicant device and the trusted device;
determine a trust score for the applicant device based on the location trust value and the environment trust value;
determine the applicant device is an additional trusted device when the trust score for the applicant device exceeds a threshold;
send a signed certificate to the applicant device over the network, the signed certificate corresponds to the CSR when the trust score for the applicant device exceeds the threshold; and
establish a secure communication channel between the server and the applicant device when the trust score exceeds the threshold.

9. The device of claim 8, wherein the onboarding information further comprises actual configuration parameters, wherein the process, when executed by the processor, is further operable to:
identify expected configuration parameters for the applicant device based on the applicant device identifier; and
compare the actual configuration parameters with the expected configuration parameters to determine a configuration trust value, and wherein the process to determine the trust score is further operable to determine the trust score for the applicant device based on the location trust value, the environment trust value, and the configuration trust value.

10. The device of claim 9, wherein the actual configuration parameters and the expected configuration parameters correspond to one or more hardware components or software components.

11. The device of claim 8, wherein the CSR is associated with an activation time, wherein the process, when executed by the processor, is further operable to:
compare the activation time to an authorized activation time period to determine an activation trust value, and
wherein the process to determine the trust score is further operable to determine the trust score for the applicant device based on the location trust value, the environment trust value, and the activation trust value.

12. The device of claim 8, wherein the process, when executed by the processor, is further operable to:
provide the trust score to a device associated with a network administrator; and
receive an input by the network administrator that indicates the applicant device is the additional trusted device when the trust score for the applicant device exceeds the threshold.

13. The device of claim 8, wherein the process to determine environment trust value is further operable to:
discover one or more neighbor devices in proximity to the applicant device;
determine at least one neighbor device is the trusted device based on a device identifier for the at least one neighbor device and the database of device identifiers for registered devices associated with one or more customers.

14. The device of claim 8, wherein the applicant device identifier includes at least one of a media access control address (MAC) address or a serial number.

15. A tangible, non-transitory, computer-readable media having instructions encoded thereon, the instructions, when executed by a processor, is operable to:
receive a certificate signing request (CSR) and onboarding information for an applicant device, the onboarding information includes at least an applicant device identifier and an applicant Internet Protocol (IP) address;
identify a customer associated with the applicant device based on the applicant device identifier and a database of device identifiers for registered devices associated with one or more customers;
determine at least one of the registered devices associated with the customer is a trusted device;
determine a location trust value for the applicant device based on a geolocation proximity between the applicant IP address and a trusted IP address for the trusted device;
determine an environment trust value for the applicant device based on a proximity in a network topology between the applicant device and the trusted device;
determine a trust score for the applicant device based on the location trust value and the environment trust value;
determine the applicant device is an additional trusted device when the trust score for the applicant device exceeds a threshold;
send a signed certificate to the applicant device, the signed certificate corresponds to the CSR when the trust score for the applicant device exceeds the threshold; and
establish a secure communication channel between the server and the applicant device when the trust score exceeds the threshold.

16. The tangible, non-transitory, computer-readable media of claim 15, wherein the onboarding information further comprises actual configuration parameters, wherein, the instructions, when executed by a processor, are further operable to:
identify expected configuration parameters for the applicant device based on the applicant device identifier; and
compare the actual configuration parameters with the expected configuration parameters to determine a configuration trust value, and
wherein the instructions to determine the trust score are further operable to determine the trust score for the applicant device based on the location trust value, the environment trust value, and the configuration trust value.

17. The tangible, non-transitory, computer-readable media of claim 15, wherein, the instructions to determine the environment trust value are further operable to:
discover one or more neighbor devices in proximity to the applicant device;
determine at least one neighbor device is the trusted device based on a device identifier for the at least one neighbor device and the database of device identifiers for registered devices associated with one or more customers.

18. The tangible, non-transitory, computer-readable media of claim 15, wherein the CSR is associated with an activation time, wherein the instructions are further operable to:
compare the activation time to an authorized activation time period to determine an activation trust value, and
wherein determining the trust score comprises determining the trust score for the applicant device based on the location trust value, the environment trust value, and the activation trust value.

19. The tangible, non-transitory, computer-readable media of claim 15, wherein the applicant device identifier includes at least one of a media access control address (MAC) address or a serial number.

20. The tangible, non-transitory, computer-readable media of claim 15, wherein the instructions are further operable to:
provide the trust score to a device associated with a network administrator; and
receive a user input that indicates the applicant device is the additional trusted device when the trust score for the applicant device exceeds the threshold.

* * * * *